(12) United States Patent
Zhang et al.

(10) Patent No.: US 12,651,427 B2
(45) Date of Patent: Jun. 9, 2026

(54) FACE IMAGE RESTORATION METHOD, SYSTEM, STORAGE MEDIUM AND DEVICE

(71) Applicant: NANJING UNIVERSITY OF POSTS AND TELECOMMUNICATIONS, Nanjing (CN)

(72) Inventors: Dengyin Zhang, Nanjing (CN); Weidan Yan, Nanjing (CN); Chao Zhou, Nanjing (CN); Junhao Ying, Nanjing (CN); Yingying Feng, Nanjing (CN); Yi Liu, Nanjing (CN)

( * ) Notice: Subject to any disclaimer, the term of this patent is extended or adjusted under 35 U.S.C. 154(b) by 242 days.

(21) Appl. No.: 18/669,125

(22) Filed: May 20, 2024

(65) Prior Publication Data

US 2025/0124687 A1 Apr. 17, 2025

(30) Foreign Application Priority Data

Oct. 16, 2023 (CN) .......................... 202311332176.2

(51) Int. Cl.
*G06V 10/426* (2022.01)
*G06V 10/44* (2022.01)
*G06V 40/16* (2022.01)

(52) U.S. Cl.
CPC .......... *G06V 10/426* (2022.01); *G06V 10/457* (2022.01); *G06V 40/168* (2022.01)

(58) Field of Classification Search
CPC .. G06V 10/426; G06V 10/457; G06V 40/168;

G06V 10/82; G06N 3/0455; G06N 3/042; G06N 3/0464; G06N 3/084; G06T 2207/20081; G06T 2207/20084; G06T 2207/30201
See application file for complete search history.

(56) References Cited

U.S. PATENT DOCUMENTS

| | | | | |
|---|---|---|---|---|
| 9,799,098 | B2 * | 10/2017 | Seung ........................ | G06T 5/60 |
| 12,299,845 | B1 * | 5/2025 | Zhang ........................ | G06T 5/60 |
| 12,315,295 | B1 * | 5/2025 | Zhang .................... | G06V 10/82 |
| 2015/0363634 | A1 * | 12/2015 | Yin ........................ | G06V 40/171 |
| | | | | 382/118 |
| 2020/0151546 | A1 * | 5/2020 | Liu ......................... | G06N 3/096 |
| 2021/0256355 | A1 * | 8/2021 | Chen ..................... | G06N 3/047 |
| 2021/0279515 | A1 * | 9/2021 | Zhang .................... | G06F 18/214 |
| 2023/0080031 | A1 * | 3/2023 | Zhang .................... | G06V 10/82 |
| | | | | 382/118 |

FOREIGN PATENT DOCUMENTS

| | | |
|---|---|---|
| CN | 112801912 A | 5/2021 |
| CN | 116563954 A | 8/2023 |
| CN | 116664435 A | 8/2023 |

* cited by examiner

*Primary Examiner* — Bobbak Safaipour

(57) ABSTRACT
The present application discloses a face image restoration method, a system, a storage medium and a device, the restoration model adopted in the above method starts from structured information of a face, generates a structured face graph based on features of the to-be-restored face image, and restores face image by the structured face graph and the decoder, which can solve the problem that it is difficult to capture and learn structured information based on the traditional convolution operation, and improve the indicators of the face restoration and enriches the visualization effect.

7 Claims, 2 Drawing Sheets obtaining a to-be-restored face image — S1 inputting the to-be-restored face image into a pre-trained restoration model to obtain a restored face image — S2

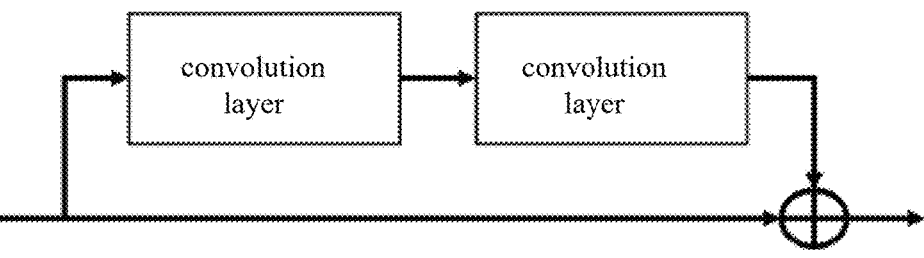
FIG. 4
| face graph convolution module 1 | ······ | face graph convolution module 8 |
FIG. 5
| convolution layer (size of 1) | residual graph convolution module | residual graph convolution module |
FIG. 6
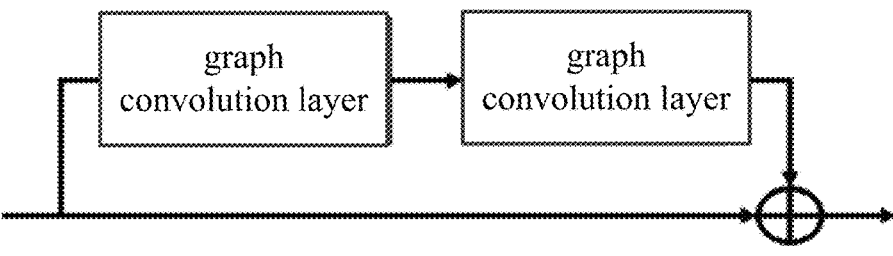
FIG. 7

1

FACE IMAGE RESTORATION METHOD, SYSTEM, STORAGE MEDIUM AND DEVICE

CROSS-REFERENCE TO RELATED APPLICATIONS

The present application claims priority to Chinese Patent Application No. 202311332176.2, filed Oct. 16, 2023, the entire disclosure of which is incorporated herein by reference.

TECHNICAL FIELD

The present application relates to a face image restoration method, a system, a storage medium and a device, and belongs to the field of image processing technology.

BACKGROUND

With the continuous development of science technology and the continuous improvement of social living standards, more and more imaging devices are invented and used, such as smart phones, cameras, monitors, drones, etc. With the popularity of the devices and the evolution of modern communication technologies, image and video data are exponentially increased. Especially, in social platforms such as Instagram and TikTok, there exists a large amount of data based on human, in addition, the face recognition, face searching in mobile phone albums, pedestrian tracking in drones and monitors, etc. are emerged in endlessly. However, due to the following possible situations: instability of the imaging device, such as focus failure, camera shake; imaging environment factors, such as low light, high exposure, the movement of the subject; network transmission conditions, such as compression, zoom, codec format, etc., it leads to various types of images and different degrees of degradation, such as blurring, noise, etc., especially for the face image, the complexity of degradation not only reduces the viewing effect, but also causes serious consequences when facing scenes that require high-precision face images, such as access control, payment, and public security.

Thus, the face image restoration aims to restore clear face images from the degraded counterpart for subsequent tasks such as face detection and recognition. Compared with natural image restoration, face images contain not only visual perception details, but also individual facial features and identity information, because face images are a highly structured information representation.

Currently, face restoration methods can be divided into three categories: methods based on geometric priors, methods based on reference, methods based on generative priors; most of the above methods make use of convolution networks, but it is difficult to capture and learn structured information based on traditional convolution operations, leading to poor accuracy of the face restoration.

SUMMARY

The present application provides a face image restoration method, a system, a storage medium and a device, which solves the problems disclosed in the background technology.

In order to solve the above technical problems, the technical solutions adopted in the present application are:

a face image restoration method, including:

obtaining a to-be-restored face image; and inputting the to-be-restored face image into a pre-trained restoration model to obtain a restored face image.

2

The restoration model includes an encoder, a structured face graph generation module, an adaptive adjacency matrix generator, a face graph convolution network, and a decoder;

the encoder is configured for generating face image features based on the to-be-restored face image;

the adaptive adjacency matrix generator is configured for adaptively generating an adjacency matrix that represents connection relationships of face image feature blocks based on the face image features;

a structured face graph generation module is configured for generating a structured face image by using the face image feature blocks as nodes and the generated adjacency matrix as the connection relationship;

a face graph convolution network is configured for generating a restored face feature image based on the structured face graph; and a decoder is configured for generating the restored face image based on the restored face feature graph.

In one embodiment, the encoder includes six residual convolution modules and five 2-fold down-sampling modules, and the six residual convolution modules are alternately connected in series with the five 2-fold down-sampling modules in the encoder; and the decoder symmetrically comprises six residual convolution modules and five 2-fold up-sampling modules, and the six residual convolution modules are alternately connected in series with the five 2-fold up-sampling modules in the decoder.

In one embodiment, the adaptive adjacency matrix generator includes three residual convolution modules and one fully connected layer connected in series in sequence.

In one embodiment, the face graph convolution network includes eight face graph convolution modules connected in series in sequence; each face graph convolution module comprises one convolution layer and two residual graph convolution modules connected in series in sequence.

In one embodiment, when training, a loss function of the restoration model is:

$$L = L_{l1} + \lambda_{sw}L_{sw} + \lambda_{Facestruct}L_{Facestruct}$$

L is a loss function of the restoration model, and $L_{l1}$, $L_{SW}$, $L_{Facestruct}$ are a L1 loss, a small-world model loss, and a face structure loss, $L_{Facestruct}$ takes symmetry and aggregation characteristics of a face into account, and $\lambda_{SW}$, $\lambda_{Facestruct}$ are weights of $L_{SW}$, $L_{Facestruct}$, respectively.

In one embodiment, a formula of $L_{Facestruct}$ is:

$$L_{Facestruct} = \frac{1}{end-start} \sum_{n=start}^{end} \left( \frac{1 - m[n][len-2-n] + m[n][len-1-n] + m[n][len-n]}{3} + \frac{1}{end-start} \sum_{n=start}^{end} \left( 1 - \frac{m[n][n-1] + m[n][n+1]}{2} \right) \right)$$

$l_{en}$ is the total number of nodes represented by the adjacency matrix, start=winsize//2 is a parameter, end=len-winsize//2 is a parameter, // means to take an integer division, winsize is a control variable, m[][] represents an element in the adjacency matrix, and n is the node number.

A face image restoration system, including:

an image acquisition module configured for obtaining a to-be-restored face image; and a restoration module configured for inputting the to-be-restored face image into a pre-trained restoration model to obtain a restored face image;

The restoration model includes an encoder, a structured face graph generation module, an adaptive adjacency matrix generator, a face graph convolution network, and a decoder;

the encoder is configured for generating face image features based on the to-be-restored face image;

the adaptive adjacency matrix generator is configured for adaptively generating an adjacency matrix that represents connection relationships of face image feature blocks based on the face image features;

a structured face graph generation module is configured for generating a structured face image by using the face image feature blocks as nodes and the generated adjacency matrix as a node connection relationship;

a face graph convolution network is configured for generating a restored face feature image based on the structured face graph; and a decoder is configured for generating the restored face image based on the restored face feature graph.

In one embodiment, in the restoration module, when training, a loss function of the restoration model is:

$$L = L_{l1} + \lambda_{sw}L_{sw} + \lambda_{Facestruct}L_{Facestruct}$$

L is a loss function value of the restoration model, and $L_{l1}$, $L_{SW}$,$L_{Facestruct}$ are a L1 loss, a small-world model loss, and a face structure loss value, $L_{Facestruct}$ takes symmetry and aggregation characteristics of a face into account, and $\lambda_{SW}$, $\lambda_{Facestruct}$ are weights of $L_{SW}$, $L_{Facestruct}$, respectively.

A computer-readable storage medium on which one or more programs are stored, the one or more programs includes instructions, which, when executed by a computing device, cause the computing device to perform the face image restoration method.

A computing device includes:

one or more processors, a memory, and one or more programs;

the one or more programs are stored in the memory and configured to be executed by the one or more processors, the one or more programs include instructions for executing the face image restoration method.

Beneficial effect achieved by the present application: the restoration model adopted in the present application starts from structured information of a face, generates a structured face graph based on features of the to-be-restored face image, and restores the face image from the structured face graph via the decoder, which can solve the problem that it is difficult to capture and learn structured information based on the traditional convolution operation, improving the indicators of the face restoration and enriches the visualization effect.

BRIEF DESCRIPTION OF THE DRAWINGS

FIG. 4 is the structure of a residual convolution module.

FIG. 5 is the structure of a face graph convolution network.

FIG. 6 is the structure of a face graph convolution module.

FIG. 7 is the structure of a residual graph convolution module.

DETAILED DESCRIPTION OF THE EMBODIMENTS

The present application is further described below in conjunction with the accompanying drawings. The following embodiments are only used to more clearly illustrate the technical solution of the present application, and cannot be used to limit the scope of the present application.

Figure 1:
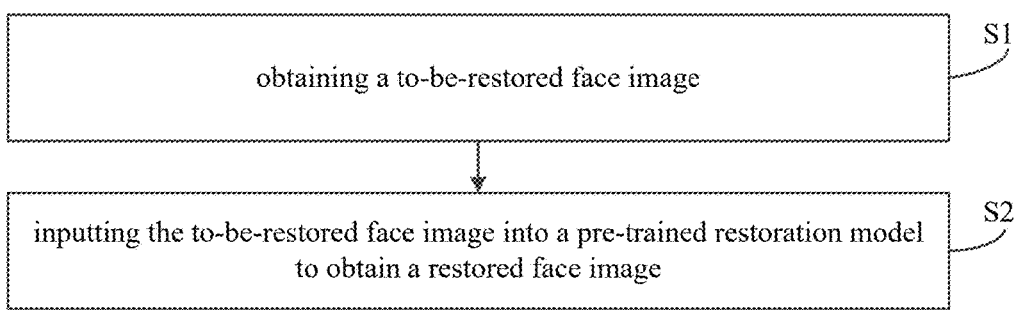
FIG. 1 is the flow chart of a face image restoration method.

As shown in FIG. 1, a face image restoration method includes:

Step S1, obtaining a to-be-restored face image;

Step S2, inputting the to-be-restored face image into a pre-trained restoration model to obtain a restored face image; the restoration model includes an encoder, a structured face graph generation module, an adaptive adjacency matrix generator, a face graph convolution network, and a decoder; the encoder is configured for generating face image features based on the to-be-restored face image; the adaptive adjacency matrix generator is configured for generating an adjacency matrix that represents connection relationships of face image feature blocks based on the face image features; a structured face graph generation module is configured for generating a structured face graph by using the face image feature blocks as nodes and the adjacency matrix as a node connection relationship; a face graph convolution network is configured for generating a restored face feature graph based on the structured face graph; and a decoder is configured for generating the restored face image based on the restored face feature graph.

The restoration model adopted in the present application starts from structured information of a face, generates a structured face graph based on features of the to-be-restored face image, and restores face image from the structured face graph via the decoder, which can solve the problem that it is difficult to capture and learn structured information based on the traditional convolution operation, improving the indicators of the face restoration and enriches the visualization effect.

Figure 2:
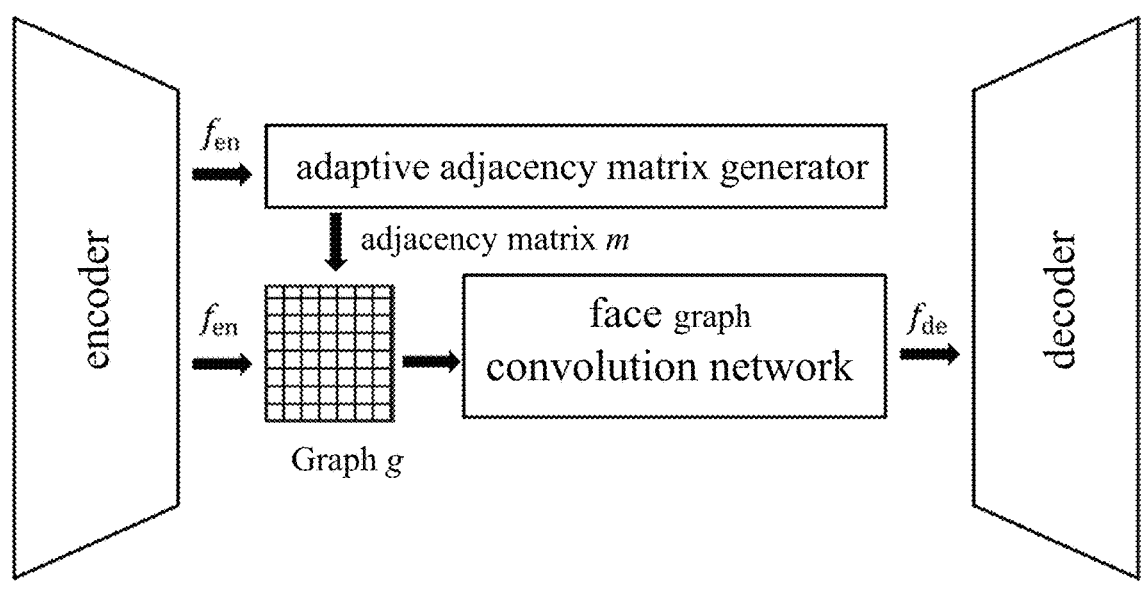
FIG. 2 is the structure of a restoration model.
Figure 3:
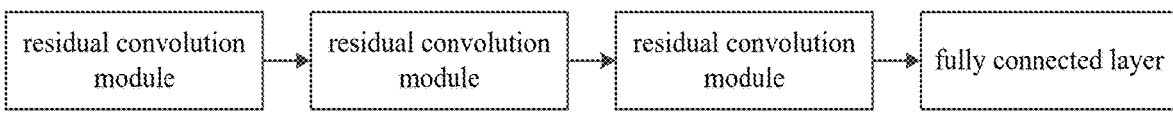
FIG. 3 is the structure of an adaptive adjacency matrix generator.

Since it is difficult to capture and learn structured information based on traditional convolution operations, the present application needs to abstract the face image features into a learnable gragh, and then adopts graph convolution for learning. Based on the above idea, as shown in FIG. 2, the restoration model may specifically include an encoder, a structured face graph generation module, an adaptive adjacency matrix generator, a face graph convolution network, and a decoder.

As shown in FIGS. 3 to 7, the encoder includes six residual convolution modules and five 2-fold down-sampling modules, and the six residual convolution modules are alternately connected in series with the five 2-fold down-sampling modules in the encoder; and the decoder symmetrically includes six residual convolution modules and five 2-fold up-sampling modules, and the six residual convolution modules are alternately connected in series with the five 2-fold up-sampling modules in the decoder. The adaptive adjacency matrix generator includes three residual convolution modules and one fully connected layer connected in series in sequence. The face graph convolution module includes one convolution layer and two residual graph convolution modules connected in series in sequence.

The residual convolution module uses residual learning to fully exploit the feature information, specifically the residual convolution module includes two convolution layers connected in series in sequence, input features are input into the two convolution layers to obtain output features, which are then summed with the input features as the output of the module. The down-sampling module is a convolution layer with a convolution kernel of 2 and a step-length of 2. The up-sampling module takes the small-size input features, specifically, the up-sampling module includes one convolution layer with convolution kernel of 1 and one sub-pixel layer with 2-fold up-sampling connected in series in sequence. The face graph convolution module uses the graph convolution to process the structured facial information, specifically including one convolution layer with a convolution kernel of 1 and two residual graph convolution modules connected in series in sequence, the residual graph convolution module uses the graph convolution layer to replace the convolution layer.

The above encoder generates face image features based on the to-be-restored face image; the adaptive adjacency matrix generator generates an adjacency matrix that represents connection relationships of face image feature blocks based on the face image features, specifically divides the face image features into feature blocks according to a checkerboard pattern, and generates the adjacency matrix based on reachable prediction results between the feature blocks. The reachable prediction results represent the correlation between the face image feature blocks, i.e., the degree to which different feature blocks affect each other. The structured face graph generation module divides the face image features output by the encoder into feature blocks according to the checkerboard pattern, and generates a structured face graph by using the feature blocks as nodes and the generated adjacency matrix as the node connection relationship. The face graph convolution network generates a restored face feature graph based on the structured face graph, specifically restores nodes in the face graph to the face feature image according to the reverse operation of the checkerboard pattern division operation. The decoder generates the restored face image based on the face feature graph.

The above model, starting from the structured information of the face, uses the graph convolution network for more effective structured data learning, and in order to achieve graph learning, the face features are abstracted to the graph, which improves the numerical results generated by the network and enriches the visualization effect; and the adaptive adjacency matrix generator can dynamically generate adjacency matrices with specificity based on the input degraded face images to better construct graphs to efficiently adapt to graph convolution operations.

Based on the above structure, the loss function of the above model when training can be as follows: $L=L_{l1}+\lambda_{SW}L_{SW}+\lambda_{Facestruct}L_{Facestruct}$ L is a loss function value of the restoration model, and $L_{l1}$, $L_{SW}$, $L_{Facestruct}$ are a L1 loss, a small-world model loss, and a face structure loss, $L_{Facestruct}$ takes symmetry and aggregation characteristics of a face into account, and $\lambda_{SW}$, $\lambda_{Facestruct}$ are weights of $L_{SW}$, $L_{Facestruct}$, which take the values of 0.1 and 0.01, respectively.

$$L_{l1} = |x - \hat{x}|_1$$

where, $\hat{x}$ is an output of the restoration model, x is a corresponding label (ground truth) of $\hat{x}$, i.e., high quality face image, and $|\ |_1$ denotes the mean absolute deviation.

$$L_{sw} = MSE\ (AvgPath\ (m),\ \log 2\ (len) + KL\ (CluCoe\ (m),\ 0.8))$$

where, MSE is a mean square loss function, KL is a Kullback-Leibler scatter, AvgPath(m) is an average shortest path length for calculating the adjacency matrix m, CluCoe(m) is the average clustering coefficient function for calculating the adjacency matrix m, and len is the number of nodes represented by the adjacency matrix m. The small-world model loss makes the generated image conform to the average shortest path and higher clustering coefficients of the small-world model to match the tight connections and information spreading in the face structure.

$$L_{Facestruct} = \frac{1}{end-start}\sum_{n=start}^{end}\left(\begin{array}{l} 1 - m\,[n][len - 2 - n] + \\ m\,[n][len - 1 - n] + \\ \dfrac{m\,[n][len - n]}{3} + \\ \dfrac{1}{end-start}\sum_{n=start}^{end}\left(1 - \dfrac{m\,[n][n-1] + m\,[n][n+1]}{2}\right)\end{array}\right)$$

where, $l_{en}$ is the number of nodes represented by the adjacency matrix, start=winsize//2 is a parameter, end=len-winsize//2 is a parameter, // means to take an integer division, winsize is a control variable, m //// represents an element in the adjacency matrix, e.g., m[i] [j] denotes the connection relationship between node i and node j, m[i][j] taking the value of 1 or 0 indicates that node i and node j are connected (accessible) or not connected (inaccessible), respectively.

The face structure loss takes the symmetry and aggregation characteristics of the face into account, which makes the constructed graph more consistent with the face structure, in addition, the proposed control variables are changed to adapt to various complex face images.

Further, when training the above model, first the face dataset can be obtained, which is the high-definition face dataset Flickr-Faces-Hight-Quality (FFHQ), which is downloaded from existing public face databases, obtaining the high-quality face images $I_{hq}$ in the face dataset, specifically each image is extracted from the FFHQ dataset and is adjusted to 512×512, the formula $I_{lq}=\{JPEG_q((I_{hg}*k_\sigma)\downarrow_s+\eta_\delta)\}\uparrow_s$ is used to generate the degraded face image $I_{lq}$, where * is the convolution operation, $k_\sigma$ is the blur kernel with sigma=σ, $\downarrow_s$, $\uparrow_s$ are the s-fold down-sampling operation and the s-fold up-sampling operation, respectively, and $\eta_\delta$ is the Gaussian noise with sigma=δ, and the parameters mentioned above are all randomly selected within a reasonable range.

$I_{lq}$ is used as the input of the model and $I_{hq}$ is used as its label, the restoration model based on graph convolution network is trained, and when training, the gradient descent method is used to continuously train the network, and the training is stopped when the loss function is at its minimum to obtain the trained restoration model, and the to-berestored face image is inputted into the trained restoration model, and then the restored face image can be obtained.

The present application uses the graph convolution network to mine and learn the rich structured information in the face images, the proposed adaptive adjacency matrix generator adaptively generates the adjacency matrix according to the degradation type and degradation degree of the input face image, and the face graph convolution network transforms the structured face features and continuously learns the structured features by using the residual graph convolution module, which provides the main learning capability for the face image restoration task and takes high metrics improvement and enhances visualization effect in the result.

Based on the same technical solution, the present application also discloses a software system for the above method, a face image restoration system includes an image acquisition module configured for obtaining a to-be-restored face image; and a restoration module configured for inputting the to-be-restored face image into a pre-trained restoration model to obtain a restored face image.

The restoration model includes an encoder, a structured face graph generation module, an adaptive adjacency matrix generator, a face graph convolution network, and a decoder; the encoder is configured for generating face image features based on the to-be-restored face image; the adaptive adjacency matrix generator is configured for generating an adjacency matrix that represents connection relationships of face image feature blocks based on the face image features; a structured face graph generation module is configured for generating a structured face graph by using the face image feature blocks as nodes and the generated adjacency matrix as the node connection relationship; a face graph convolution network is configured for generating a restored face feature image based on the structured face image; and a decoder is configured for generating the restored face image based on the restored face feature graph.

In the restoration module, the loss function of the restoration model when training is:

$$L = L_{l1} + \lambda_{sw}L_{sw} + \lambda_{Facestruct}L_{Facestruct}$$

L is a loss function value of the restoration model, and $L_{l1}$, $L_{SW}$, $L_{Facestruct}$ are a L1 loss, a small-world model loss, and a face structure loss, $L_{Facestruct}$ takes symmetry and aggregation characteristics of a face into account, and $\lambda_{SW}$, $\lambda_{Facestruct}$ are weights of $L_{SW}$,$L_{Facestruct}$, respectively.

The restoration model adopted by the above system starts from the structured information of the face, generates a structured face graph based on the features of the to-be-restored face image, and carries out face image restoration from the structured face graph via the decoder, which can solve the problem that it is difficult to capture and learn structured information based on the traditional convolution operation, improving the numerical accuracy of the face restoration and enriches the visualization effect.

Based on the same technical solution, the present application also discloses a computer-readable storage medium storing one or more programs, the one or more programs includes instructions, which, when executed by a computing device, cause the computing device to perform the face image restoration method.

Based on the same technical solution, the present application also discloses a computing device, which includes one or more processors, a memory, and one or more programs, the one or more programs are stored in the memory and configured to be executed by the one or more processors, the one or more programs include instructions for performing face image restoration.

It should be appreciated by those skilled in the art that embodiments of the present application may be provided as methods, systems, or computer program products. Thus, the present application may take the form of a fully hardware embodiment, a fully software embodiment, or an embodiment that combines software and hardware aspects. Further, the present application may take the form of a computer program product implemented on one or more computer-usable storage media (including, but not limited to, disk memory, CD-ROM, optical memory, etc.) containing computer-usable program code therein.

The present application is described with reference to flowcharts and/or block diagrams of methods, devices (systems), and computer program products according to embodiments of the present application. It should be understood that each of the processes and/or boxes in the flowchart and/or block diagram, and the combination of processes and/or boxes in the flowchart and/or block diagram, may be implemented by computer program instructions. These computer program instructions may be provided to a processor of a general-purpose computer, a special-purpose computer, an embedded processor, or other programmable data processing device to produce a machine, such that the instructions executed by the processor of the computer or other programmable data processing device produce a device for carrying out the functions specified in the one process or processes of the flowchart and/or the one box or boxes of the block diagram.

These computer program instructions may also be stored in computer-readable memory capable of directing the computer or other programmable data processing device to operate in a particular manner, such that the instructions stored in that computer-readable memory produce an article of manufacture comprising an instruction device that implements a function specified in one or more processes of a flowchart and/or one or more boxes of a block diagram.

These computer program instructions may also be loaded onto a computer or other programmable data processing device, such that a series of operational steps are performed on the computer or other programmable device to produce computer-implemented processing, such that the instructions performed on the computer or other programmable device provide steps for implementing the functionality specified in one process or processes of the flowchart and/or and/or the one box or boxes of the block diagram.

The above are only examples of the present application and are not intended to limit the present application, and any modifications, equivalent substitutions, improvements, etc., within the spirit and principles of the present application are included within the scope of the claims of the present application.

What is claimed is:

1. A face image restoration method, comprising:

obtaining a to-be-restored face image; and inputting the to-be-restored face image into a pre-trained restoration model to obtain a restored face image;

wherein the restoration model comprises an encoder, a structured face graph generation module, an adaptive adjacency matrix generator, a face graph convolution network, and a decoder;

the encoder is configured for generating face image features based on the to-be-restored face image;

the adaptive adjacency matrix generator is configured for generating an adjacency matrix that represents connection relationships of face image feature blocks based on the face image features;

a structured face graph generation module is configured for generating a structured face graph by using the face image feature blocks as nodes and the adjacency matrix as the node connection relationship;

a face graph convolution network is configured for generating a restored face feature graph based on the structured face graph; and a decoder is configured for generating the restored face image based on the restored face feature graph;

wherein the encoder comprises six residual convolution modules and five 2-fold down-sampling modules, and the six residual convolution modules are alternately connected in series with the five 2-fold down-sampling modules in the encoder; and the decoder comprises six residual convolution modules and five 2-fold up-sampling modules, and the six residual convolution modules are alternately connected in series with the five 2-fold up-sampling modules in the decoder.

2. The face image restoration method according to claim 1, wherein the adaptive adjacency matrix generator comprises three residual convolution modules and one fully connected layer connected in series in sequence.

3. The face image restoration method according to claim 1, wherein the face graph convolution network comprises eight face graph convolution modules connected in series in sequence; each face graph convolution module comprises one convolution layer and two residual graph convolution modules connected in series in sequence.

4. The face image restoration method according to claim 1, wherein when training, a loss function of the restoration model is:

$$L = L_{l1} + \lambda_{sw}L_{sw} + \lambda_{Facestruct}L_{Facestruct}$$

wherein L is a loss function of the restoration model, and Ll1, Lsw,LFacestruct are a L1 loss, a small-world model loss, and a face structure loss, LFacestruct takes symmetry and aggregation characteristics of a face into account, and λ sw, λ Facestruct are weights of Lsw, LFacestruct, respectively.

5. The face image restoration method according to claim 4, wherein a formula of $L_{Facestruct}$ is:

$$L_{Facestruct} =$$

$$\frac{1}{end-start} \sum_{n=start}^{end} \left( \begin{array}{c} 1 - m[n][len-2-n] + \\ m[n][len-1-n] + \\ \dfrac{m[n][len-n]}{3} + \\ \dfrac{1}{end-start} \sum_{n=start}^{end} \left( 1 - \dfrac{m[n][n-1] + m[n][n+1]}{2} \right) \end{array} \right)$$

wherein len is the number of nodes represented by the adjacency matrix, start=winsize//2 is a parameter, end=len-winsize//2 is a parameter, // means to take an integer division, winsize is a control variable, m[ ][ ] represents an element in the adjacency matrix, and n is a node label.

6. A non-transitory computer-readable storage medium, on which one or more programs are stored, the one or more programs comprises instructions, which, when executed by a computing device, cause the computing device to perform the method of claim 1.

7. A computing device, comprising:

one or more processors, a memory, and one or more programs;

wherein the one or more programs are stored in the memory and configured to be executed by the one or more processors, the one or more programs comprise instructions for executing the method of claim 1.

\* \* \* \* \*